United States Patent [19]
Weber et al.

[11] Patent Number: 4,975,410
[45] Date of Patent: Dec. 4, 1990

[54] THERMALLY-TRANSFERRED COLOR FILTER ARRAY ELEMENT AND PROCESS FOR PREPARING

[75] Inventors: Helmut Weber, Webster; Steven Evans, Rochester, both of N.Y.

[73] Assignee: Eastman Kodak Company, Rochester, N.Y.

[21] Appl. No.: 358,976

[22] Filed: May 26, 1989

[51] Int. Cl.$^5$ .......................... B41M 5/26; C09B 29/08; B03F 5/00; G03C 5/00

[52] U.S. Cl. .......................... 503/227; 430/495; 430/945; 430/947; 8/471; 427/146; 427/256; 428/195; 428/207; 428/480; 428/913; 428/914; 534/753; 534/850; 534/851; 534/795; 546/174; 546/175

[58] Field of Search .......................... 503/227; 430/199-255, 430/945, 7, 495

[56] References Cited

U.S. PATENT DOCUMENTS

| | | | |
|---|---|---|---|
| 4,081,277 | 3/1978 | Brault et al. | 96/38.2 |
| 4,701,439 | 10/1987 | Weaver et al. | 503/227 |

FOREIGN PATENT DOCUMENTS

| | | | |
|---|---|---|---|
| 235939 | 9/1987 | European Pat. Off. | 503/227 |
| 60-631565 | 2/1985 | Japan | 503/227 |
| 61-227092 | 10/1986 | Japan | 503/227 |
| 61-268494 | 11/1986 | Japan | 503/227 |
| 62-099195 | 5/1987 | Japan | 503/227 |
| 62-132684 | 6/1987 | Japan | 503/227 |

*Primary Examiner*—Floyd D. Higel
*Attorney, Agent, or Firm*—Harold E. Cole

[57] ABSTRACT

A thermally-transferred color filter array element comprising a transparent support having thereon a thermally-transparent image comprising a repeating mosaic pattern of colorants in a receiving layer, one of the colorants being a mixture of a yellow dye and a cyan dye to form a green hue, said yellow dye having the formula:

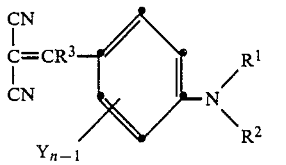

I wherein:

$R^1$ and $R^2$ represents hydrogen, alkyl, cycloalkyl, aryl or hetaryl; or can be taken together to form a 5- or 6-membered ring; or either or both of $R^1$ and $R^2$ can be joined to a carbon atom of the aromatic ring to form a 5- or 6-membered ring;

$R^3$ represents hydrogen or halogen:

Y represents hydrogen, halogen, cyano, alkyl, alkoxy, aryl, hetaryl, aryloxy, acylamido, alkylsulfonamido, or arylsulfonamido; and n is a positive integer from 1 to 5; and said cyan dye having the formula:

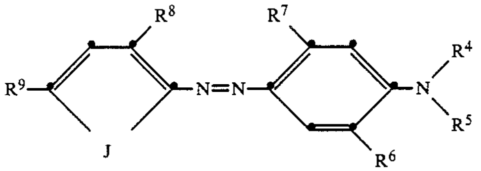

II wherein $R^4$ $R^5$ represents hydrogen, alkyl, cycloalkyl, aryl or hetaryl;

$R^6$ represents hydrogen, alkyl or alkoxy;

$R^5$ may be taken together with $R^4$ to form a 5- or 6-membered ring;

$R^4$ or $R^5$ may be combined with $R^6$ or may be joined to the carbon atom of the benzene ring to form a 5- or 6-membered ring;

$R^7$ represents hydrogen, alkyl, alkoxy, halogen, sulfonamido or acylamido;

$R^8$ represents nitro, cyano, fluorosulfonyl, alkylsulfonyl, arylsulfonyl, acyl, alkoxycarbonyl, carbamoyl, sulfamoyl, trifluoromethyl or halogen;

$R^9$ represents nitro, cyano, acyl, trifluoroacetyl, dicyanovinyl or tricyanovinyl; and J represents —S— or —CH=CR$^8$—.

20 Claims, No Drawings

THERMALLY-TRANSFERRED COLOR FILTER ARRAY ELEMENT AND PROCESS FOR PREPARING

This invention relates to the use of a mixture of a yellow dye and a cyan dye to form a green hue for a thermally transferred color filter array element which is used in various applications such as a liquid crystal display device.

In recent years, thermal transfer systems have been developed to obtain prints from pictures which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye donor element is placed face to face with a dye receiving element. The two are then inserted between a thermal printing head and a platen roller. A line type thermal printing head is used to apply heat from the back of the dye donor sheet. The thermal printing head has many heating elements and is heated up sequentially in response to the cyan, magenta and yellow signals. The process is then repeated for the other two colors. A color hard copy is thus obtained which corresponds to the original Picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the original image, so that each dye is heated to cause volatilization only in those areas in which its presence is required on the receiver to reconstruct the color of the original object. Further details of this process are found in GB No. 2,083,726A, the disclosure of which is hereby incorporated by reference.

Liquid crystal display devices are known for digital display in electronic calculators, clocks, household appliances, audio equipment, etc. There has been a need to incorporate a color display capability into such monochrome display devices, particularly in such applications as peripheral terminals using various kinds of equipment involving Phototube display, mounted electronic display, or TV-image display. Various attempts have been made to incorporate a color display using a color filter array into these devices. However, none of the color array systems for liquid crystal display devices so far proposed have been successful in meeting all the users needs.

One commercially-available type of color filter array which has been used in liquid crystal display devices for color display capability is a transparent support having a gelatin layer thereon which contains dyes having the additive primary colors red, green and blue in a mosaic pattern obtained by using a photolithographic technique. To Prepare such a color filter array element, a gelatin layer is sensitized, exposed to a mask for one of the colors of the mosaic pattern, developed to harden the gelatin in the exposed areas, and washed to remove the unexposed (uncrosslinked) gelatin, thus producing a pattern of gelatin which is then dyed with dye of the desired color. The element is then recoated and the above steps are repeated to obtain the other two colors. This method contains many labor-intensive steps, requires careful alignment, is time-consuming and very costly. Further details of this process are disclosed in U.S. Pat. 4,081,277.

In addition, a color filter array element to be used in a liquid crystal display device may have to undergo rather severe heating and treatment steps during manufacture. For example, a transparent electrode layer, such as indium tin oxide, is usually vacuum sputtered onto the color filter array element. This may take plate at temperatures elevated as high as 200° C. for times which may be one hour or more. This is followed by coating with a thin alignment layer for the liquid crystals, such as a polyimide. Regardless of the alignment layer used, the surface finish of this layer in contact with the liquid crystals is very important and may require rubbing or may require curing for several hours at an elevated temperature. These treatment steps can be very harmful to many color filter array elements, especially those with a gelatin matrix.

It is thus apparent that dyes used in color filter arrays for liquid crystal displays must have a high degree of heat and light stability above the requirements desired for dyes used in conventional thermal dye transfer imaging.

While a green dye may be formed from a mixture of one or more cyan and one or more yellow dyes, not all such combinations will produce a dye mixture with the correct hue for a color filter array. Further, when a dye mixture with the correct hue is found, it may not have the requisite stability to light. An additional requirement is that no single dye of the mixture can have an adverse effect on the stability to light or crystallinity of any of the other dye components.

U.S. Pat. No. 4,701,439 describes yellow dyes useful in thermal printing. There is no disclosure in that patent, however, that such dyes may be mixed with a particular cyan dye to form a green dye useful in a color filter array.

EP No. 235,939, JP No. 61/227,092, JP No. 60/031,565, JP No. 61/268,494, JP No. 62/099,195 and JP No. 62/132,684 relate to the use of various arylazoaniline cyan dyes for thermal dye transfer. However, none of these references describe the use of these dyes for color filter array elements.

It would be desirable to provide a color filter array element having high quality, good sharpness and which could be obtained easily and at a lower price than those of the prior art. It would also be desirable to provide such a color filter array element having a green dye of the correct hue and which would have good stability to heat and light.

These and other objects are achieved in accordance with this invention which comprises a thermally-transferred color filter array element comprising a transparent support having thereon a thermally-transferred image comprising a repeating mosaic pattern of colorants in a receiving layer, one of the colorants being a mixture of a yellow dye and a cyan dye to form a green hue, said yellow dye having the formula:

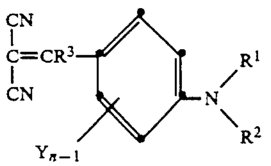

I wherein:

$R^1$ and $R^2$ each independently represents hydrogen; a substituted or unsubstituted alkyl group of from 1 to about 6 carbon atoms such as methyl, ethyl, propyl, isopropyl, butyl, pentyl, hexyl or such alkyl groups substituted with hydroxy, acyloxy, alkoxy, aryl, cyano, acylamido, halogen, etc.; a cycloalkyl group of from about 5 to about 7 carbon atoms such as cyclopentyl, cyclohexyl, p-methylcyclohexyl, etc.; a substituted or unsubstituted aryl or hetaryl group of about 6 to about 10 carbon atoms such as phenyl, p-tolyl, m-chlorophenyl, p-methoxyphenyl, m-bromophenyl, o-tolyl, etc.; or can be taken together to form, along with the nitrogen to which they are attached, a 5- or 6-membered ring such as morpholine, pyrrolidine, piperidine, oxazoline, pyrazoline, etc.; or either or both of $R^1$ and $R^2$ can be joined to a carbon atom of the aromatic ring at a position ortho to the position of attachment of the anilino nitrogen to form a 5- or 6-membered ring, thus forming a polycyclic system such as 1,2,3,4-tetrahydroquinoline, julolidine, 2,3-dihydroindole, benzomorpholine, etc.;

$R^3$ represents hydrogen or halogen such as chloro, bromo or fluoro;

Y represents hydrogen; halogen such as chloro, bromo or fluoro; cyano; a substituted or unsubstituted alkyl or alkoxy group of from 1 to about 6 carbon atoms, such as those listed above for $R^1$, methoxy, ethoxy, etc.; a substituted or unsubstituted aryl or hetaryl group of from about 6 to about 10 carbon atoms, such as those listed above for $R^1$; aryloxy; acylamido; alkylsulfonamido; or arylsulfonamido; and n is a positive integer from 1 to 5; and said cyan dye having the formula:

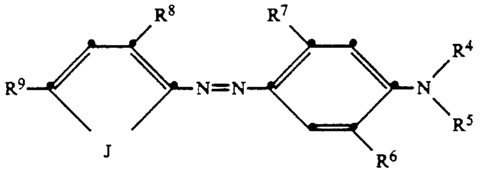

II wherein $R^4$ and $R^5$ each independently represents hydrogen; a substituted or unsubstituted alkyl group of from 1 to about 6 carbon atoms such as methyl, ethyl, propyl, isopropyl, butyl, pentyl, hexyl or such alkyl groups substituted with hydroxy, acyloxy, alkoxy, aryl, aryloxy, cyano, acylamido, alkoxycarbonyl, alkoxycarbonyloxy, phthalimido, succinimido, sulfonamido, halogen, etc.; a cycloalkyl group of from about 5 to about 7 carbon atoms such as cyclopentyl, cyclohexyl, p-methylcyclohexyl, etc.; or a substituted or unsubstituted aryl or hetaryl group of from about 6 to about 10 carbon atoms such as phenyl, p-tolyl, m-chlorophenyl, p-methoxyphenyl, m-bromophenyl, o-tolyl, naphthyl, 3-pyridyl, o-ethoxyphenyl, etc., or such groups substituted as above; $R^6$ represents hydrogen or a substituted or unsubstituted alkyl or alkoxy group of from 1 to about 10 carbon atoms such as methyl, ethyl, propyl, isopropyl, butyl, pentyl, hexyl, methoxy, ethoxy, isopropoxy, etc., or such alkyl or alkoxy groups substituted with hydroxy, acyloxy, alkoxy, aryl, aryloxy, cyano, acylamido, alkoxycarbonyl, alkoxycarbonyloxy, phthalimido, succinimido, sulfonamido, halogen, etc.;

$R^5$ may be taken together with $R^4$ to form a 5- or 6-membered ring such as morpholine, pyrrolidine, piperidine, oxazoline, pyrazoline, etc.;

$R^4$ or $R^5$ may be combined with $R^6$ or may be joined to the carbon atom of the benzene ring at a position ortho to the position of attachment of the anilino nitrogen to form a 5- or 6-membered ring, thus forming a polycyclic system such as 1,2,3,4-tetrahydroquinoline, julolidine, 2,3-dihydroindole, benzomorpholine, etc.;

$R^7$ represents hydrogen; a substituted or unsubstituted alkyl or alkoxy group of from 1 to about 10 carbon atoms such as those listed above for $R^6$; halogen such as chlorine, bromine, fluorine, etc.; sulfonamido or acylamido;

$R^8$ represents nitro, cyano, fluorosulfonyl, alkylsulfonyl, arylsulfonyl, acyl, alkoxycarbonyl, carbamoyl, sulfamoyl, trifluoromethyl or halogen;

$R^9$ represents nitro, cyano, acyl, trifluoroacetyl, dicyanovinyl or tricyanovinyl; and J represents —S— or —CH=$CR^8$—.

Yellow dyes according to formula I useful in the invention are described in U.S. Pat. No. 4,701,439, the disclosure of which is hereby incorporated by reference.

In a preferred embodiment of the invention, $R^1$ and $R^2$ in structural formula I represents the atoms which are taken together to form, along with the nitrogen to which they are attached, a 6-membered ring. In another preferred embodiment of the invention, $R^3$ in formula I is hydrogen.

The compounds according to formula I of the invention may be prepared by any of the processes disclosed in U.S. Pat. Nos. 3,917,604, 4,180,663 and 3,247,211, disclosures of which are hereby incorporated by reference.

Specific yellow dyes useful in the invention include the following:

Yellow Dyes

-continued

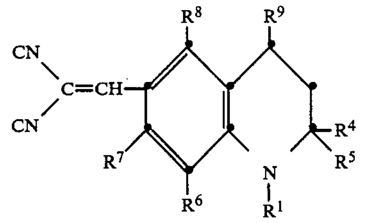

| Cmpd. No. | $R^9$ | $R^4$ | $R^5$ | $R^6$ | $R^7$ | $R^8$ | $R^1$ |
|---|---|---|---|---|---|---|---|
| A | $CH_3$ | $CH_3$ | $CH_3$ | H | $CH_3$ | H | $C_2H_4O\overset{O}{\overset{\|}{C}}NHC_6H_5$ |
| B | $CH_3$ | $CH_3$ | $CH_3$ | H | H | H | $C_2H_4O\overset{O}{\overset{\|}{C}}NHC_6H_5$ |
| C | H | H | $CH_3$ | H | $CH_3$ | H | $C_2H_4O\overset{O}{\overset{\|}{C}}NHC_6H_5$ |
| D | H | H | $CH_3$ | $OCH_3$ | H | $CH_3$ | $C_2H_4O\overset{O}{\overset{\|}{C}}NHC_6H_5$ |
| E | $CH_3$ | $CH_3$ | $CH_3$ | H | $CH_3$ | H | $CH_2\underset{CH_3}{\underset{\|}{CH}}O\overset{O}{\overset{\|}{C}}NHC_6H_5$ |
| F | $CH_3$ | $CH_3$ | $CH_3$ | H | $CH_3$ | H | 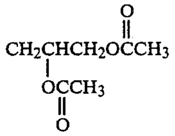 |
| G | $CH_3$ | $CH_3$ | $CH_3$ | H | $CH_3$ | H | 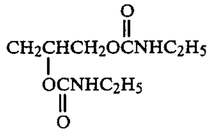 |
| H | $CH_3$ | $CH_3$ | $CH_3$ | H | $CH_3$ | H | $CH_2CH_2CH_2NH\overset{O}{\overset{\|}{C}}NHC_6H_5$ |
| I | $CH_3$ | $CH_3$ | $CH_3$ | H | $CH_3$ | H | $CH_2CH_2CH_2NH\overset{O}{\overset{\|}{C}}OC_2H_5$ |
| J | $CH_3$ | $CH_3$ | $CH_3$ | H | $CH_3$ | H | 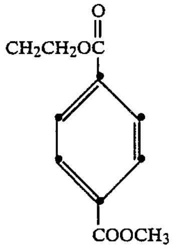 |
| K | H | H | $CH_3$ | H | Cl | H | 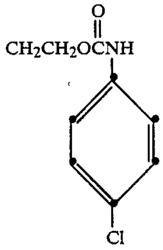 |

-continued
| | | | | | | | |
|---|---|---|---|---|---|---|---|
| L | H | H | $CH_3$ | H | $CH_3$ | H | 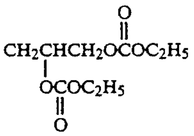 |
| M | H | H | $CH_3$ | H | $CH_3$ | H | 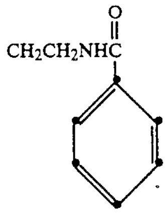 |
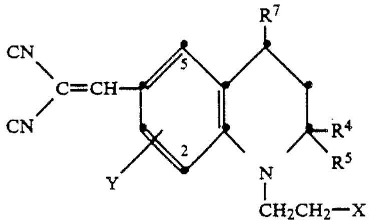
| Compound No. | $R^7$ | $R^4$ | $R^5$ | Y | X |
|---|---|---|---|---|---|
| N | $CH_3$ | $CH_3$ | $CH_3$ | 3-$CH_3$ | $-OCO-NH(C_6H_5)$ |
| O | $CH_3$ | $CH_3$ | $CH_3$ | 3-$CH_3$ | $-OCO-CH_2OC_6H_5$ |
| P | $CH_3$ | $CH_3$ | $CH_3$ | 2-$OCH_3$ 5-$CH_3$ | $-OCO-NH[C_6H_3\text{-}3,5\text{-}(OCH_3)_2]$ |
| Q | $CH_3$ | $CH_3$ | $CH_3$ | 2-$OCH_3$ 5-$CH_3$ | $-OCO-(C_6H_4\text{-}4\text{-}CO_2CH_3)$ |
| R | $CH_3$ | $CH_3$ | $CH_3$ | 2-$OCH_3$ 5-$CH_3$ | $-N(-CH_3)(-SO_2C_6H_5)$ |
| S | $CH_3$ | $CH_3$ | $CH_3$ | 3-$CH_3$ | 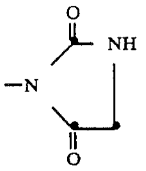 |
T
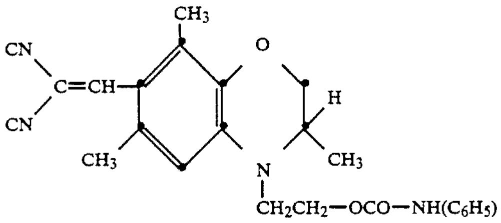
U
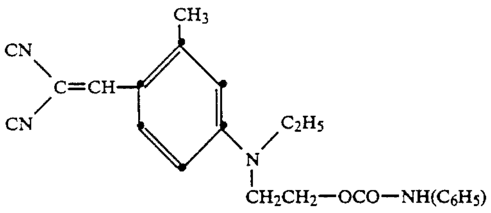

-continued

| | |
|---|---|
| V | 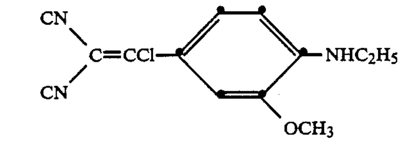 |
| W | 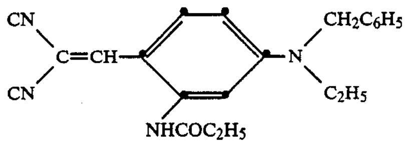 |

In another preferred embodiment of the invention, $R^4$ and $R^5$ in the above formula II for cyan dyes are each independently hydrogen, ethyl, n-propyl, benzyl, cyclohexyl, $-(C_2H_4O)_2C_2H_2$, or may be taken together to form a morpholino group. In another preferred embodiment of the invention, $R^6$ is hydrogen or methoxy and $R^7$ is $-NHCOCH^3$. In yet another preferred embodiment of the invention, $R^8$ is cyano or trifluoromethyl and $R^9$ is nitro or cyano. In yet still another preferred embodiment of the invention, J is S or $-CH{=}CR^8-$ wherein $R^8$ is nitro or cyano.

Specific cyan dyes useful in the invention include the following:

Cyan Dyes

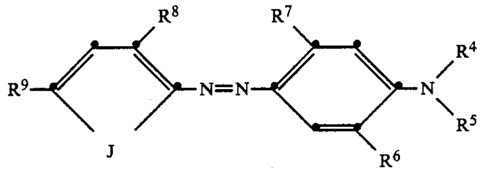

| | $R^4$ | $R^5$ | $R^6$ | $R^7$ | $R^8$ | $R^9$ | J | λmax* (nm) |
|---|---|---|---|---|---|---|---|---|
| 1 | $C_2H_5$ | $C_2H_5$ | $OCH_3$ | $NHCOCH_3$ | $CF_3$ | $NO_2$ | $-CH{=}CH-NO_2$ | 621 |
| 2 | $C_2H_5$ | c-$C_6H_{11}$ | $OCH_3$ | $NHCOCH_3$ | CN | $NO_2$ | $-CH{=}CH-CN$ | 646 |
| 3 | $C_2H_5$ | c-$C_6H_{11}$ | $OCH_3$ | $NHCOCH_3$ | CN | $CH{=}C(CN)_2$ | $-CH{=}CH-CN$ | 672 |
| 4 | $C_2H_5$ | $C_2H_5$ | $OCH_3$ | $NHCOCH_3$ | CN | $NO_2$ | $-CH{=}CH-NO_2$ | 635 |
| 5 | n-$C_4H_9$ | n-$C_4H_9$ | $OCH_3$ | $NHCOCH_3$ | CN | $NO_2$ | $-CH{=}CH-NO_2$ | 638 |
| 6 | H | $CH_3CHC_4H_9$-n | $OCH_3$ | $NHCOCH_3$ | $NO_2$ | $COCF_3$ | —S— | 649 |
| 7 | $C_2H_5$ | $C_2H_5$ | $OCH_3$ | $CH_3$ | $NO_2$ | $COCF_3$ | —S— | 671 |

| Cyan Dyes | | λmax* (nm) |
|---|---|---|
| 8 | 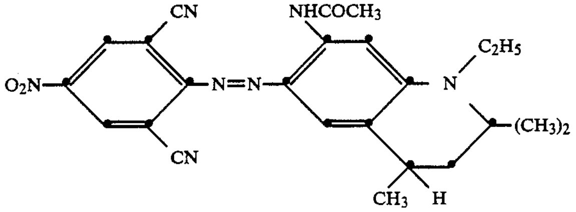 | 623 |

*In acetone

The dye receiving layer of the color filter array element of the invention may comprise, for example, sucrose acetate or polymers such as a polycarbonate, a polyurethane, a polyester, a polyvinyl chloride, a polyamide, a polystyrene, an acrylonitrile, a polycaprolactone or mixtures thereof. The dye receiving layer may be present in any amount which is effective for the intended purpose. In general, good results have been obtained at a concentration of from about 0.25 to about 5 $g/m^2$.

In a preferred embodiment of the invention, the receiving layer comprises a polycarbonate binder having a $T_g$ greater than about 200° C. as described in Application Serial No. 334,269 of Harrison et al., filed Apr. 6, 1989, the disclosure of which is hereby incorporated by reference. The term "polycarbonate" as used herein means a polyester of carbonic acid and one or more glycols or dihydric phenols. In another preferred embodiment, the polycarbonate is derived from a bisphenol component comprising a diphenyl methane moiety. Examples of such polycarbonates include those derived from 4,4'-(hexahydro 4,7-methanoindene-5-ylidene)bisphenol, 2,2',6,6'-tetrachlorobisphenol-A and 4,4'-(2-norbornylidene)bisphenol.

In another preferred embodiment of the invention, the mosaic pattern which is obtained by the thermal transfer process consists of a set of red, green and blue additive primaries.

In another preferred embodiment of the invention, each area of primary color and each set of primary colors are separated from each other by an opaque area, e.g., black grid lines. This has been found to give improved color reproduction and reduce flare in the displayed image.

The size of the mosaic set is normally not critical since it depends on the viewing distance. In general, the individual pixels of the set are from about 50 to about 300 μm. They do not have to be of the same size.

In a preferred embodiment of the invention, the repeating mosaic pattern of dye to form the color filter array consists of uniform, square, linear repeating areas, with one color diagonal displacement as follows:

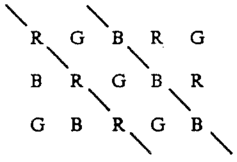

In another preferred embodiment, the above squares are approximately 100 μm.

As noted above, the color filter array elements of the invention are used in various display devices such as a liquid crystal display device. Such liquid crystal display devices are described, for example, in UK Patents Nos. 2,154,355; 2,130,781; 2,162,674 and 2,161,971.

A process of forming a color filter array element according to the invention comprises a) imagewise heating a dye donor element comprising a support having thereon a dye layer as described above, and b) transferring portions of the dye layer to a dye-receiving element comprising a transparent support having thereon a dye-receiving layer, the imagewise heating being done in such a way as to produce a repeating mosaic pattern of dyes to form the color filter array element.

Various methods can be used to supply energy to transfer dye from the dye donor to the transparent support to form the color filter array of the invention. There may be used, for example, a thermal print head. A high intensity light flash technique with a dye donor containing an energy absorptive material such as carbon black or a non-subliming light-absorbing dye may also be used. This method is described more fully in U.K. Application No. 8824366.2 by Simons filed Oct. 18, 1988, the disclosure of which is hereby incorporated by reference.

Another method of transferring dye from the dye-donor to the transparent support to form the color filter array of the invention is to use a heated embossed roller as described more fully in U.K. Application No. 8824365.4 by Simons filed Oct. 18, 1988, the disclosure of which is hereby incorporated by reference.

In a preferred embodiment of the invention, a laser is used to supply energy to transfer dye from the dye-donor to the receiver as described more fully in U.S. Ser. No. 259,080, filed Oct. 18, 1988 of DeBoer entitled "Color Filter Array Element Obtained by Laser induced Thermal Dye Transfer", now abandoned, the disclosure of which is hereby incorporated by reference.

If a laser or high intensity light flash is used to transfer dye from the dye donor to the receiver, then an additional absorptive but non-volatile material is used in the dye donor. Any material that absorbs the laser or light energy may be used such as carbon black or non-volatile infrared-absorbing dyes or pigments which are well known to those skilled in the art. Cyanine infrared absorbing dyes may also be employed with infrared diode lasers as described in DeBoer Application Serial No. 221,163 filed July 19, 1988, now abandoned, the disclosure of which is hereby incorporated by reference.

A dye donor element that is used to form the color filter array element of the invention comprises a support having thereon a mixture of dyes to form a green hue as described above along with other colorants such as imaging dyes or pigments to form the red and blue areas. Other imaging dyes can be used in such a layer provided they are transferable to the dye receiving layer of the color array element of the invention by the action of heat. Especially good results have been obtained with sublimable dyes. Examples of additive sublimable dyes include anthraquinone dyes, e.g., Sumikalon Violet RS® (Sumitomo Chemical Co., Ltd.), Dianix Fast Violet 3R-FS® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR® (Nippon Kayaku Co., Ltd.), Sumickaron Diazo Black 5G® (Sumitomo Chemical Co., Ltd.), and Miktazol Black 5GH® (Mitsui Toatsu Chemicals, Inc.): direct dyes such as Direct Brown M® and Direct Fast Black D® (Nippon Kayaku Co. Ltd.); acid dyes such as Kayanol Milling Cyanine 5R® (Nippon Kayaku Co. Ltd.); basic dyes such as Sumicacryl Blue 6G® (Sumitomo Chemical Co., Ltd.). Examples of subtractive dyes useful in the invention include the following:

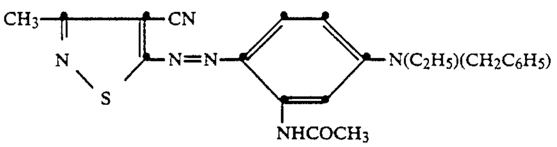
(magenta)

-continued

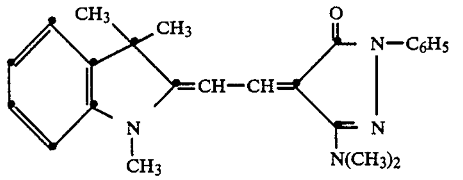

(yellow)

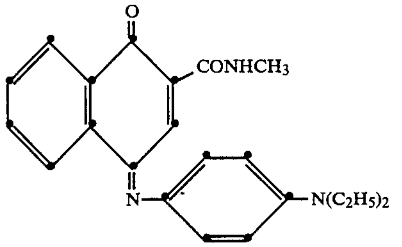

(cyan)

or any of the dyes disclosed in U.S. Pat. No. 4,541,830. The above cyan, magenta, and yellow subtractive dyes may be employed in various combinations, either in the dye donor itself or by being sequentially transferred to the dye image-receiving element, to obtain the other desired blue and red additive primary colors. The dyes may be mixed within the dye layer or transferred sequentially if coated in separate dye layers. The dyes may be used at a coverage of from about 0.05 to about 1 $g/m^2$.

The imaging dye, and an infrared or visible light-absorbing material if one is present, are dispersed in the dye donor element in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 $g/m^2$.

The dye layer of the dye donor element may be coated on the support or printed thereon by a printing technique such as a gravure process.

Any material can be used as the support for the dye donor element provided it is dimensionally stable and can withstand the heat generated by the thermal transfer device such as a laser beam. Such materials include polyesters such as poly(ethylene terephthalate); polyamides; polycarbonates; glassine paper; condenser paper; cellulose esters., fluorine polymers: polyethers; polyacetals; polyolefins; and polyimides. The support generally has a thickness of from about 2 to about 250 μm. It may also be coated with a subbing layer, if desired.

The support for the dye image-receiving element or color filter array element of the invention may be any transparent material such as polycarbonate, poly(ethylene terephthalate), cellulose acetate, polystyrene, etc. In a preferred embodiment, the support is glass.

After the dyes are transferred to the receiver, the image may be treated to further diffuse the dye into the dye receiving layer in order stabilize the image. This may be done by radiant heating, solvent vapor, or by contact with heated rollers. The fusing step aids in preventing fading upon exposure to light and surface abrasion of the image and also tends to prevent crystallization of the dyes. Solvent vapor fusing may also be used instead of thermal fusing.

Several different kinds of lasers could be used to effect the thermal transfer of dye from a donor sheet to the dye receiving element to form a color filter array element, such as ion gas lasers like argon and krypton; metal vapor lasers such as copper, gold, and cadmium., solid state lasers such as ruby or YAG; or diode lasers such as gallium arsenide emitting in the infrared region from 750 to 870 nm. However, in practice, the diode lasers are preferred because they offer substantial advantages in terms of their small size, low cost, stability, reliability, ruggedness, and ease of modulation. In practice, before any laser can be used to heat a dye-donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Lasers which can be used to transfer dye from the dye donor element to the dye image-receiving element to form the color filter array element in a preferred embodiment of the invention are available commercially. There can be employed, for example, Laser Model SDL 2420-H2® from Spectrodiode Labs, or Laser Model SLD 304 V/W® from Sony Corp.

The following example is provided to illustrate the invention.

EXAMPLE

A green dye donor was prepared by coating on a gelatin subbed transparent 175 μm poly(ethylene terephthalate) support a dye layer containing cyan dye 5 illustrated above (0.21 $g/m^2$) and yellow dye A illustrated above (0.23 $g/m^2$) in a cellulose acetate propionate (2.5% acetyl, 46% propionyl) binder (0.26 $g/m^2$) coated from a 1-propanol, 2-butanone, toluene and cyclopentanone solvent mixture. The dye layer also contained Raven Black No. 1255® (Columbia Carbon Co.) (0.21 $g/m^2$) ball-milled to submicron particle size, FC 431® dispersing agent (3M Company) (0.01 $g/m^2$) and Solsperse® 2400 dispersing agent (ICI Corp.) (0.03 $g/m^2$).

A control green dye donor was prepared as described above except that it contained the following indoaniline cyan dye (0.64 $g/m^2$) as described in U.S. Pat. No. 4,695,287 instead of cyan dye 5:

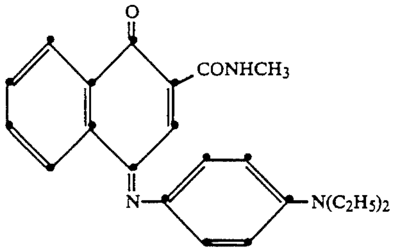

A dye-receiver was prepared by spin-coating the following layers on a 53 μ thick flat-surfaced borosilicate glass:

1) Subbing layer of duPont VM 651 Adhesion Promoter as a 1% solution in a methanol-water solvent mixture (0.5 μm thick layer equivalent to 0.54 g/m$^2$), and
2) Receiver layer of a polycarbonate of 4,4'-(hexahydro 4,7 methanoindene 5-ylidene)bisphenol, as described in U.S. Application Ser. No. 334,269, of Harrison et al. referred to above, from methylene chloride solvent (2.5 g/m$^2$).

The dye donor was placed face down upon the dye-receiver. A Mecablitz® Model 45 (Metz AG Company) electronic flash unit was used as a thermal energy source. It was placed 40 mm above the dye-donor using a 45 degree mirror box to concentrate the energy from the flash unit to a 25×50 mm area. The dye transfer area was masked to 12×42 mm. The flash unit was flashed once to produce a transferred transmission density of 1.9 at the maximum absorption of the dye mixture.

The same flash transfer procedure was used for the control coating producing a transferred transmission density of 2.0 at the maximum density of the dye mixture.

Each transferred area was placed under a Pyropanel® no. 4083 (Research Inc., Minneapolis Mn.) infrared heat panel at 230° C. for 45 sec. to diffuse the dyes into the dye receiving layer.

The Red and Blue Status A densities of the transferred area were read. Each transferred area was then placed in an oven at 180° C., 25% RH for one hour and the densities were re read to determine the % dye loss. Each transferred area was also subjected to exposure for 4 days, 50 kLux, 5400° K., approximately 25% RH. The densities were then re-read to determine the percent dye loss due to light fade The following results were obtained:

| | Red Status A Density | | | Blue Status A Density | | |
|---|---|---|---|---|---|---|
| Receiver | Init. | Heated | % Loss | Init. | Heated | % Loss |
| Control | 2.00 | 0.81 | 60 | 1.06 | 0.96 | 9 |
| Invention | 1.89 | 1.81 | 4 | 1.80 | 1.74 | 3 |
| | Red Status A Density | | | Blue Status A Density | | |
| Receiver | Init. | Faded | % Loss | Init. | Faded | % Loss |
| Control | 1.76 | 0.98 | 44 | 1.01 | 0.96 | 11 |
| Invention | 1.77 | 1.49 | 16 | 1.57 | 1.57 | 6 |

The above results indicate that the receiver containing the dyes according to the invention had better stability to heat and light than the control receiver containing an indoaniline cyan dye.

The invention has been described in detail with particular reference to preferred embodiments thereof, but it will be understood that variations and modifications can be effected within the spirit and scope of the invention.

WHAT IS CLAIMED IS:

1. A thermally-transferred color filter array element comprising a transparent support having thereon a thermally-transferred image comprising a repeating mosaic pattern of colorants in a receiving layer, one of said colorants being a mixture of a yellow dye and a cyan dye to form a green hue, said yellow dye having the formula:

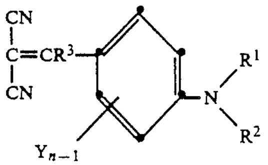

I wherein $R^1$ and $R^2$ each independently represents hydrogen; a substituted or unsubstituted alkyl group of from 1 to about 6 carbon atoms; a cycloalkyl group of from about 5 to about 7 carbon atoms; a substituted or unsubstituted aryl or hetaryl group of about 6 to about 10 carbon atoms; or taken together form, along with the nitrogen to which they are attached, a 5- or 6-membered ring; or either or both of $R^1$ and $R^2$ are joined to a carbon atom of the aromatic ring at a position ortho to the position of attachment of the anilino nitrogen to form a 5- or 6-membered ring;

$R^3$ represents hydrogen or halogen;

Y represents hydrogen; halogen; cyano; a substituted or unsubstituted alkyl or alkoxy group of from 1 to about 6 carbon atoms; a substituted or unsubstituted aryl or hetaryl group of from about 6 to about 10 carbon atoms; aryloxy; acylamido, alkylsulfonamido; or arylsulfonamido; and n is a positive integer from 1 to 5; and said cyan dye having the formula:

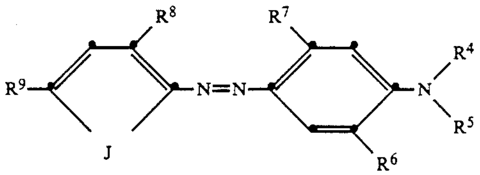

II wherein $R^4$ and $R^5$ each independently represents hydrogen; a substituted or unsubstituted alkyl group of from 1 to about 6 carbon atoms; a cycloalkyl group of from about 5 to about 7 carbon atoms; or a substituted or unsubstituted aryl or hetaryl group of from about 6 to about 10 carbon atoms;

$R^6$ represents hydrogen or a substituted or unsubstituted alkyl or alkoxy group of from 1 to about 10 carbon atoms; or $R^5$ and $R^4$ taken together form a 5- or 6-membered ring; or $R^4$ or $R^5$ are combined with $R^6$ or to the carbon atom of the benzene ring at a position ortho to the position of attachment of the anilino nitrogen to form a 5- or 6-membered ring;

$R^7$ represents hydrogen, a substituted or unsubstituted alkyl or alkoxy group of from 1 to about 10 carbon atoms, halogen, sulfonamido or acylamido;

$R^8$ represents nitro, cyano, fluorosulfonyl, alkylsulfonyl, arylsulfonyl, acyl, alkoxycarbonyl, carbamoyl, sulfamoyl, trifluoromethyl or halogen;

$R^9$ represents nitro, cyano, acyl, trifluoroacetyl, dicyanovinyl or tricyanovinyl; and J represents —S— or —CH=CR$^8$—.

2. The element of claim 1 wherein said receiving layer comprises a polycarbonate binder having a $T_g$ greater than about 200° C.

3. The element of claim 2 wherein said polycarbonate is derived from a bisphenol component comprising a diphenyl methane moiety.

4. The element of claim 1 wherein said $R^1$ and said $R^2$ in said structural formula I represents the atoms which are taken together to form, along with the nitrogen to which they are attached, a 6-membered ring.

5. The element of claim 1 wherein said $R^4$ and said $R^5$ in said structural formula II are each independently hydrogen, ethyl, n-propyl, benzyl, cyclohexyl, —$(C_2H_4O)_2C_2H_2$, or taken together to form a morpholino group.

6. The element of claim 1 wherein said pattern consists of a set of red, green and blue additive primaries.

7. The element of claim 1 wherein each area of said primary color and each said set of primary colors are separated from each other by an opaque area.

8. The element of claim 1 wherein said thermally-transferred image is obtained using laser induction.

9. The element of claim 1 wherein said thermally transferred image is obtained using a high intensity light flash.

10. The element of claim 1 wherein said support is glass.

11. A process of forming a color filter array element comprising a) imagewise-heating a dye-donor element comprising a support having thereon a dye layer, and b) transferring portions of said dye layer to a dye-receiving element comprising a transparent support having thereon a dye-receiving layer, said imagewise-heating being done in such a way as to produce a repeating mosaic pattern of dyes to form said color filter array element, one of said dyes being a mixture of a yellow dye and a cyan dye to form a green hue, said yellow dye having the formula:

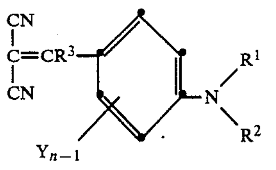

I wherein:

$R^1$ and $R^2$ each independently represents hydrogen; a substituted or unsubstituted alkyl group of from 1 to about 6 carbon atoms; a cycloalkyl group of from about 5 to about 7 carbon atoms; a substituted or unsubstituted aryl or hetaryl group of about 6 to about 10 carbon atoms; or taken together form, along with the nitrogen to which they are attached, a 5- or 6-membered ring; or either or both of $R^1$ and $R^2$ are joined to a carbon atom of the aromatic ring at a position ortho to the position of attachment of the anilino nitrogen to form a 5- or 6-membered ring;

$R^3$ represents hydrogen or halogen;

Y represents hydrogen; halogen; cyano; a substituted or unsubstituted alkyl or alkoxy group of from 1 to about 6 carbon atoms; a substituted or unsubstituted aryl or hetaryl group of from about 6 to about 10 carbon atoms; aryloxy; acylamido, alkylsulfonamido; or arylsulfonamido; and n is a positive integer from 1 to 5; and said cyan dye having the formula:

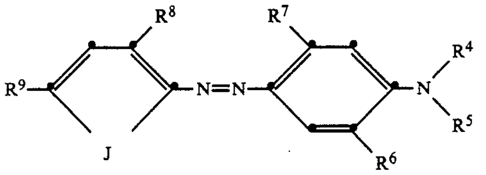

II wherein $R^4$ and $R^5$ each independently represents hydrogen; a substituted or unsubstituted alkyl group of from 1 to about 6 carbon atoms; a cycloalkyl group of from about 5 to about 7 carbon atoms; or a substituted or unsubstituted aryl or hetaryl group of from about 6 to about 10 carbon atoms;

$R^6$ represents hydrogen or a substituted or unsubstituted alkyl or alkoxy group of from 1 to about 10 carbon atoms; or $R^5$ and $R^4$ taken together form a 5- or 6-membered ring; or $R^4$ or $R^5$ are combined with $R^6$ or to the carbon atom of the benzene ring at a position ortho to the position of attachment of the anilino nitrogen to form a 5- or 6-membered ring;

$R^7$ represents hydrogen, a substituted or unsubstituted alkyl or alkoxy group of from 1 to about 10 carbon atoms, halogen, sulfonamido or acylamido;

$R^8$ represents nitro, cyano, fluorosulfonyl, alkylsulfonyl, arylsulfonyl, acyl, alkoxycarbonyl, carbamoyl, sulfamoyl, trifluoromethyl or halogen;

$R^9$ represents nitro, cyano, acyl, trifluoroacetyl, dicyanovinyl or tricyanovinyl; and J represents —S— or —CH=CR$^8$—.

12. The process of claim 11 wherein said receiving layer comprises a polycarbonate binder having a $T_g$ greater than about 200° C.

13. The process of claim 12 wherein said polycarbonate is derived from a bisphenol component comprising a diphenyl methane moiety.

14. The process of claim 11 wherein said $R^1$ and said $R^2$ in said structural formula I represents the atoms which are taken together to form, along with the nitrogen to which they are attached, a 6-membered ring.

15. The process of claim 11 wherein said $R^4$ and said $R^5$ in said structural formula II are each independently hydrogen, ethyl, n-propyl, benzyl, cyclohexyl, —$(C_2H_4O)_2C_2H_2$, or taken together to form a morpholino group.

16. The process of claim 11 wherein said dye-donor element contains an additional light-absorbing non volatile material.

17. The process of claim 16 wherein a laser is used to supply energy in said imagewise-heating step.

18. The process of claim 16 wherein a high intensity light flash is used to supply energy in said imagewise-heating step.

19. The process of claim 11 which includes a further step of heating the transferred image to further diffuse the dye into said dye receiving layer.

20. The process of claim 11 which includes a further step of subjecting the transferred image to solvent vapor to further diffuse the dye into said dye-receiving layer.

* * * * *